United States Patent Office 3,426,326
Patented Feb. 4, 1969

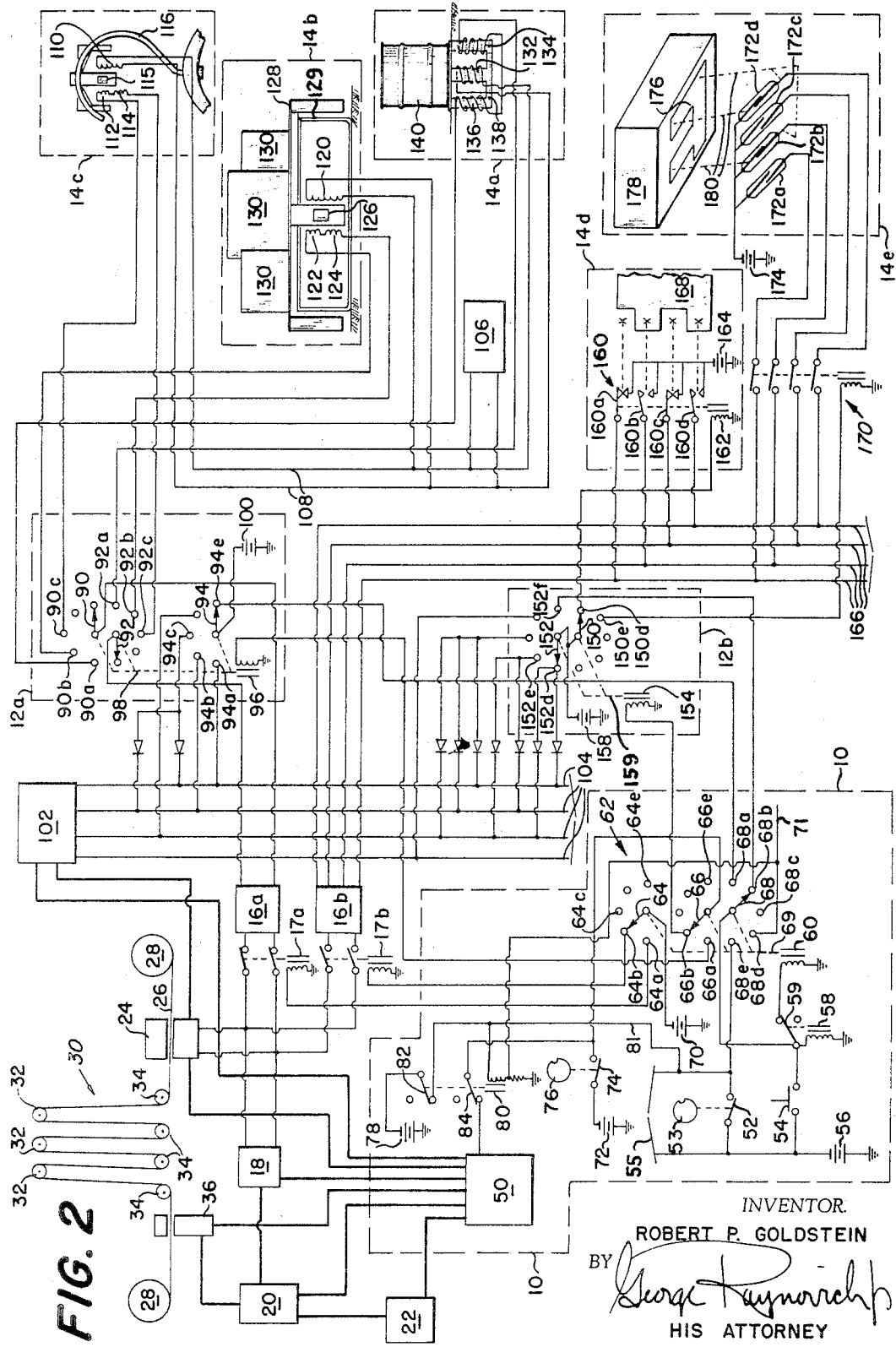

3,426,326
AUTOMATIC INVENTORY DATA ACQUISITION
APPARATUS
Robert P. Goldstein, 429 Pacific Ave.,
Pittsburgh, Pa. 15221
Filed June 21, 1963, Ser. No. 289,560
U.S. Cl. 340—153          8 Claims
Int. Cl. H04q 1/22, 3/02, 9/02

This invention relates to apparatus for automatically acquiring inventory data from a number of locations, and more particularly, to apparatus which may be utilized to acquire complete information concerning an inventory of goods at any desired interval of time without expending the time, effort, and experiencing at least a partial stoppage of business usually associated with acquiring inventory data.

A great many businesses require continuous, or near-continuous information regarding inventory of goods. Such information is necessary to businesses that desire to determine potential shortages of fast-moving merchandise. Continuous inventorying is important in warehousing operations in order to warn of losses due to pilfering and misrouting. Practically all businesses must have inventory figures for use in preparing balance sheets and other financial statements.

In order to satisfy the requirements for inventory data, two common approaches are presently utilized. The first approach involves taking a "physical inventory." That is, the actual viewing and listing of all items concerned in the inventory is accomplished manually, at intervals consistent with the needs of the business. The second approach makes use of records that show the addition and removal of items. Starting with a known inventory, an accurate accounting of the addition and removal of items makes it possible to determine the amount of any item on hand at a given time.

In practice, most businesses make use of a combined system of taking "physical inventories" at frequent intervals and relying on stock movement records to correct the figures at any desired time. The use of the combined system points out the serious deficiency in conventional inventorying methods. As a practical matter, the stock movement records are not sufficiently reliable, and hence, there is a necessity to supplement stock movement records with periodic "physical inventories." The cost of taking a "physical inventory," which requires a partial dispensation of business, the expenditure of waiver, and the accounting that occurs, makes a "physical inventory" justifiable only at infrequent intervals. The combined system, even at best, cannot effectively account for items that have become lost or have been stolen. Nor can the best of present day inventory methods keep pace with a rapidly changing situation. Such rapidly changing situations arise in today's automated manufacturing facilities when parts are stored for only short intervals of time before they are required in the final manufacturing process. Inventorying inaccuracies require additional parts and material to be stocked in order to insure that no shortages will occur to halt the entire manufacturing operations. Such storage of additional items requires expenditure of additional capital and inventory which could be removed with the use of the automatic inventorying system of the present invention.

The automatic inventory data acquisition apparatus of the present invention consists of a number of sensor elements strategically located throughout the quantity of goods to be inventoried. These sensor elements are associated with measurement of the goods and provide an indication of the quantity of a particular type of goods at a particular location at any given time. The sensor elements are generally permanent fixtures in the locations of the goods to be inventoried.

Each of the sensor elements, upon interrogation, is designed to indicate the quantity of goods at a particular location where the sensor is installed.

Since there are many sensors to enable large quantities of goods to be inventoried, the sensors may be grouped on subcircuits which enable the individual sensor elements to be more readily interrogated. Each of the subcircuits, containing a number of sensors, is controlled by a collector which sequentially interrogates the sensor elements and returns the results of the interrogation to the data storage portion of the inventory apparatus.

The data storage portion of the present invention is a conventional digital computer component modified to function in an inventory data acquisition and control operation. The data from the sensor elements that is passed through the collector elements to the data storage unit is retained in the data storage unit for comparison and control of the inventory at particularly selected times.

The entire operation of the inventory data acquisition apparatus of the present invention is controlled by a command unit which programs the interval of interrogation of the individual sensors and groups of sensors, and determines to what use the data so acquired shall be put. The command unit, for example, may be programed to produce inventory data on a complete inventory basis at intervals ranging anywhere from every fifteen (15) minutes to once a day or once a week. The command unit can also be programed with a standard inventory which, when compared with the inventory data acquired by interrogation of the sensors, can initiate the signal for changes to replenish certain supplies that are becoming low or to stop orders on certain supplies which are not moving. The storage of the inventory data also may be such that the reordering of material can be accomplished on a rate-of-change-of-inventory basis. That is, when so many individual items of a particular type of material are utilized per hour, that particular item can be restocked on a more frequent basis.

The individual sensor elements of the inventory data acquisition apparatus of the present invention may be designed to record the inventory in a number of ways. If the items to be inventoried are uniform in size and weight, then the weight of the item will be the simplest of accounting methods since the number of items will be a direct function of the weight of the total quantity. Thus, weight sensitive sensors can be utilized in a great number of cases to indicate the total number of items remaining in a particular location.

For bulk quantities and liquids, a volume sensitive device is usually the most convenient. Thus, a sensor for these items will indicate volume.

Items that are irregularly shaped or do not have uniform weight per item may be individually counted by particular sensors of the present invention. These individual counting sensors may also be arranged with coded elements so that, for example, a garment of a particular size may be identified and inventoried even though it does not differ significantly in weight or volume from a garment of a larger or smaller size.

With the foregoing considerations in mind, it is a primary object of the present invention to provide an automatic inventory data acquisition apparatus which can provide a complete inventory of goods at frequent intervals without expenditure of time and labor.

Another object of this invention is to provide inventory data acquisition apparatus which does not require manual entry of the information at the source, but rather which automatically perceives changes in inventory.

Another object of this invention is to provide inventory apparatus that cannot be intentionally or accidentally caused to falsify the inventory information.

Another object of this invention is to provide inventory apparatus that is convenient and readily adaptable to the common methods of storing and moving articles in industry and commerce.

Still another object of this invention is to provide automatic inventory apparatus that is easily coordinated with conventional accounting procedures due to the similarity to conventional inventorying methods.

Another object of this invention is to provide inventory apparatus that is economical due to the use of inexpensive components in the inventorying system.

Another object of this invention is to provide automatic inventory data acquisition apparatus whose design is sufficiently flexible to permit the automatic sensing and inventory of items stored in all known conventional manner.

Another object of this invention is to provide inventory apparatus that is adaptable to changes in inventory configuration and manner of storage.

These and other objects of this invention will become apparent as this description proceeds in conjunction with the accompanying drawings.

In the drawings:

FIGURE 2 is a semi-schematic circuit drawing of typical elements of the present invention utilizing all electrical components.

FIGURE 3 is a semi-schematic circuit drawing of the present invention, similar to FIGURE 2, utilizing pneumatic and hydraulic sensing channels in combination with electric circuitry.

Figure 1:
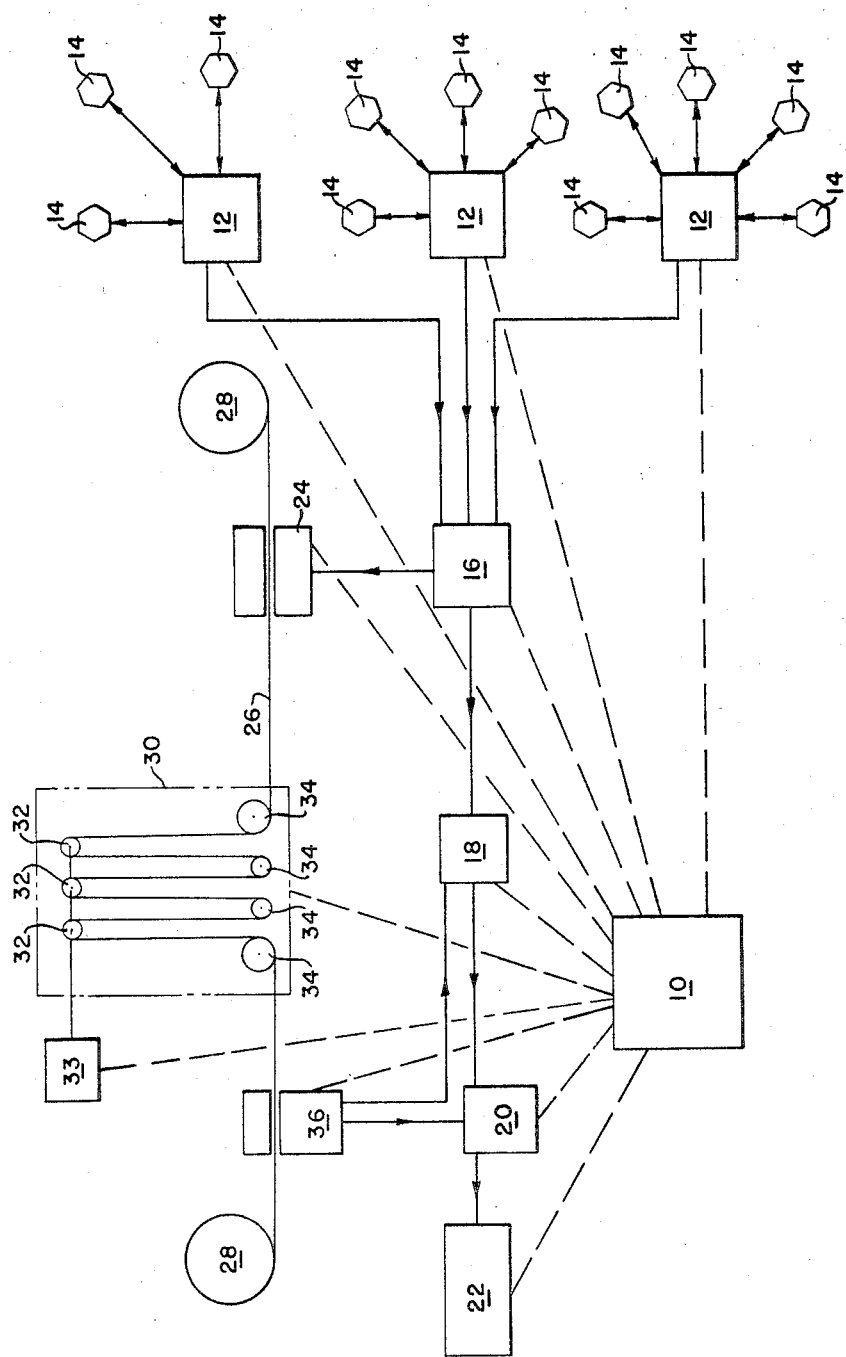
FIGURE 1 is a block diagram presentation of the basic elements of the present invention.

Referring now to the drawings, and particularly to FIGURE 1, there is shown a command unit 10 which controls the inventory data acquisition apparatus. The command unit 10 is connected to each of the other elements of the inventory apparatus.

A number of collectors 12 are shown schematically in FIGURE 1. The collectors 12 are positioned at points throughout the goods to be inventoried and are, in effect, command and reporting stations for the individual sensors 14 shown schematically in FIGURE 1. As shown in FIGURE 1, a group of sensors 14 are associated with each of the collectors 12.

Upon actuation by the collectors 12, the individual sensors 14 are interrogated to determine the presence, absence, or quantity of the particular items among which the individual sensor 14 is located.

The results of the interrogation of each of the individual sensors 14 are passed by the collectors 12 to a converter 16. The converter 16 converts the raw data into a form acceptable by a digital computer. Since much of the data received from sensors 14 through collectors 12 will be in analogue form due to the type of sensors involved, the converter 16 may be a simple analogue-digital converter to prepare the information for a digital computer.

From the converter 16, the inventory data may be sent either to a perforator 24 or other type of computer component to prepare the data for storage, and/or it may be sent to the comparator 18 to be directly compared with their inventory data already in the data storage portion of the apparatus.

The results of the comparison made in comparator 18 can be transmitted to a decoder 20 which decodes the results and actuates a printer 22 in order to display the inventory data in conventional computer fashion.

If the data is transmitted from converter 16 to perforator 24, the punched tape 26 may be prepared to store the data. The data as to quantity at a particular sensor is identified with the sensor location in collector 12 and the data as to quantity is transmitted through converter 16 and placed in the storage component in association with the particular sensor location or "address" from which the quantity data is derived. In conventional fashion the punched tape 26 is driven by tape drive 28. As the tape moves, the data from the individual sensors 14, transmitted through collectors 12 to converter 16 is punched upon the tape to indicate the results of each interrogation of the particular sensors. The tape may be provided with the tape storage loop 30 which controls the position of the tape relative to the perforator 24 and the tape reader 36. The tape storage loop 30 has a number of adjustable loop control rollers 32 and a number of fixed loop control rollers 34. The adjustable rollers 32 are moved vertically by adjustment apparatus 33 so that the center to center distance between rollers 34 and rollers 32 varies according to the desired timed relationship of the tape moving between perforator 24 and reader 36. The particular position of the tape is controlled by signals from the command unit 10 to the tape drive 28.

In conventional computer fashion, the tape reader 36 takes the data from the punched tape 26 and may feed it to a decoder 20 for read out by the printer 22, and/or may feed it to the comparator 18 for comparison with other inventory data.

Applying the concepts illustrated in FIGURE 1, we may consider the operation of the automatic inventory data acquisition apparatus of FIGURE 1 as it might be utilized to provide inventory data for the number of boxes of particular canned goods in a warehouse. Since the boxes of canned goods would all be of uniform size and constant weight for a particular box, each of the sensor elements 14 may be of a weight sensitive type which provides a reading of weight on a particular shelf. The boxes of canned goods would then be positioned on the appropriate shelves with a sensor 14 under each shelf of a particular type of box.

Let us further assume that there are initially 100 boxes of each type of canned goods in the inventory, and it is desired to replenish the inventory of any particular type of canned goods when the number of boxes falls below 25. With the standard type digital computer element, the program established in the command unit 10 would be such that the number 25 would be placed in the command unit 10 along with the command to print any type of canned goods wherein the supply is less than 25 boxes. The command unit 10 would also be programed to interrogate the sensor elements 14 once each hour.

Once each hour, the command unit 10 would transmit an electrical signal to one of the collectors 12 which would actuate collector 12. Collector 12 would then complete the signal path to the individual sensor 14 and interrogate that sensor. The weight of the items on the shelf over the individual sensor 14 would be indicated to the collector 12 which would, in turn, transmit that data to converter 16. Converter 16 would then transmit the data from the first individual sensor 14 to comparator 18 wherein the number of boxes recorded by the interrogation of the first sensor 14 would be compared with the number 25. If the number were greater than 25, no further action would be taken and the next sensor 14 in sequence would be interrogated. If, on the other hand, the number of boxes were less than the number 25, the comparator 18 would issue a command to the decoder 20 which would cause the printer 22 to print the name of the type of canned goods in which less than 25 boxes remained.

With such a program in the command unit 10, a printed list would be made hourly of those boxes of canned goods which were less than 25.

If it were desired to print the total inventory of the particular operation at any given time, the command unit 10 could be programmed to print all data as it is received from the individual sensors 14.

The data storage portion of the inventory data acquisition apparatus may be utilized to store a particular inventory condition at, for example, a given time, and compare the inventory so stored with a later inventory in order to determine rate of change of the inventory or to determine rate of change of any particular item in the inventory.

If, for example, it is desired to determine the hourly change in the items of the inventory and thereby determine the number of items removed or replaced each hour, the first complete inventory can be stored on punched tape 26. As the second inventory is taken, the individual items from punched tape 26 can be read by reader 36 and fed into the comparator 18. The adjustable loop control rollers 32 can time the punched tape so that as the particular item from each sensor 14 is brought through the collector 12, it reaches the comparator 18 at the same time as the reading from that particular sensor on the last previous inventory. The two items, one from a previous hour's inventory and one from the current inventory, can then be read into the comparator 18 simultaneously and compared. Their difference can then be punched by perforator 24 upon a command from command unit 10 and fed through decoder 20, and read out by printer 22. Simultaneously with being fed into comparator 18, the individual item from a sensor 14 can also be fed into perforator 24 so that perforator 24 can punch new inventory information on perforated tape 26 which can be compared, during the following hour with the current inventory then being gathered. In this manner, a running indication of the number of items gained or lost from any particular types of items can be determined.

Considering the foregoing block diagram and the basic principles shown therein, we may proceed to FIGURES 2 and 3 wherein are shown and disclosed the specific circuitry required to accomplish inventory data acquisition by the present invention.

Referring to FIGURE 2, the elements common to the elements shown on the block diagram of FIGURE 1 have been given similar reference numerals. As shown in FIGURE 2, the command unit 10 is schematically illustrated in greater detail. Collectors 12a and 12b are shown schematically in detail, and sensors 14a, 14b, 14c, 14d, and 14e, are shown in detail in FIGURE 2. FIGURE 2 also illustrates an analogue to digital converter 16a, similar to converter 16 of FIGURE 1 and a digital to digital converter 16b, also similar to the converter described in FIGURE 1.

The comparator 18, decoder 20, and printer 22, as well as the perforator 24, tape 26, tape drive 28, tape storage loop 30, and the elements of the adjustable loop control rollers are identical to those previously described in connection with FIGURE 1. The tape reader 36 is provided in a manner identical to that of FIGURE 1.

It should be understood that the computer components shown schematically in FIGURES 1 and 2 are conventional computer components and form no part of the present invention other than their use in combination with the novel elements of this invention to provide novel combinations. No detailed description of the computer components is provided since these components may take any one of a number of forms which are common to conventional computers.

In the expanded command unit 10 of FIGURE 2, there is shown schematically a tape control unit 50. The tape control unit 50 regulates the tape drive 28 in response to commands from the remaining portion of the command unit 10 as will be hereinafter described.

To initiate an interrogation sequence of the present invention, the command unit 10 is actuated either by means of a timed start which closes time start contact 52, a manual start which causes the manual start and advance contact 54 to be closed, or by auto start circuitry connecting at 55 and not shown on FIGURE 2. The time start contact 52 will be closed when the program of command unit 10 is arranged to cause closing of the time start contact 52 as by the rotation of a cam 53 which closes contact 52 and periodically initiates an interrogation sequence. If no timed start has been programmed into the command unit 10, the interrogation sequence may be initiated by momentarily pushing the start and advance contact 54 to the closed position. When either contact 52 or 54 is closed, the starting power source 56 is electrically connected to the stepping relay coil 60. When the stepping relay coil 60 is actuated, the wipers of the master step switch 62 are caused to rotate to the next point on the step switch. The advance relay coil 58 is energized by contact 54, causing the advance relay contact 59 to open and thus limiting the length of time that energy is applied to the stepping relay coil 60.

The master step switch 62 is an electrical step switch of conventional construction. The step switch 62 has a converter selector wiper 64, a sensor advance wiper 66, and a collector advance wiper 68. The three wipers, 64, 66, and 68, are mechanically connected by linkage 69 so that the three wipers rotate in unison when the stepping relay coil 60 is actuated.

In the sequencing of the master step switch 62, the initial position for the wiper 64 is on contact 64a, the initial position for wiper 66 is contact 66a, and the initial position for wiper 68 is contact 68a. When a complete interrogation sequence has been accomplished, the respective wipers 64, 66, and 68 are on contacts 64e, 66e, and 68e. With the wiper in that position, and the time start contact 52 or the auto start circuit connected at 55 being actuated, the electrical power from source 56 passes into stepping relay coil 60 through the wiper 68 to advance the step switch wipers 64, 66, and 68. On completing the motion from contact 68e to 68a, the wiper 68 opens the circuit to the stepping relay coil 60 and thereby prevents the wipers from advancing more than one contact point. Thus, with wiper 68 on contact 68e, the wiper moves to the 68a contact point to initiate an interrogation sequence.

The converter relay coil power source 70 is electrically connected to the converter selector wiper 64 of the stepping switch 62. When the wiper 64 is in contact with the contact point 64a of the step switch, a circuit is completed to relay 17a associated with converter 16a. Accordingly, the relay 17a is closed, thereby connecting the converter 16a to the comparator 18 and the tape perforator 24.

The source of power 72 is connected to a pulse generator contact 74 which, in turn, is mechanically linked to a pulse generator cam 76. The pulse generator cam 76, rotates approximately once each second and sets up the time basis for the entire inventory data acquisition apparatus. The pulse generator cam 76 and contact 74 may be considered as the time base clock for the entire system. The pulse generator contact 74 is electrically connected to the sensor advance wiper 66. The one second duration pulse generated by cam 76 and contact 74 are passed through wiper 66 to the individual sensors 14 in a manner to be more fully described.

A tape drive control power source 78 is provided to hold the tape drive control relay 80 in the closed position once the tape drive control relay 80 is energized through the actuation of the relay coil by power from power source 56 through the time start contact 52 and the control line 81. The holding contact 82 of relay 80 remains closed to connect power source 78 to relay 80, and the pulse contact 84 of relay 80 remains closed so that the pulsating power from power source 72 that passes through pulse generator contacts 74 can be conducted to the tape control unit 50 to advance the tape in synchronism with the sensors that are being interrogated by the pulsating current from pulse generator contact 74.

Still referring to FIGURE 2, there is shown an analogue collector 12a, which connects the converter 16a with the individual sensors 14a, 14b, 14c, 14d, and 14e. The collector 12a is formed, essentially, of a conventional three part step switch which has a sensor wiper 90, a sensor wiper 92, and an address wiper 94. The step switch of collector 12a is stepped by stepping coil 96 which is connected to the wipers 90, 92 and 94 by linkage 98.

The sensor wipers 90 and 92 connect the individual sensors to the collector 12a at timed intervals, in a manner to be more fully hereinafter described. The address wiper 94 connects the address power source 100 sequentially to the address register 102 through the address bus 104 and so that as the wiper 94 rotates to each of its successive positions 94a, 94b, 94c, and 94d, and 94e, the address register 102 receives a unique grouping of signals to provide an address for each data signal that is relayed from the individual sensors.

Each of the analogue sensors 14a, 14b, and 14c are connected to a carrier frequency supply 106 by a carrier frequency bus 108. A carrier frequency current is impressed upon a component of each of the analogue sensors 14a, 14b, and 14c at all times. To interrogate the individual sensors, another component of the sensors is electrically connected, through the collector 12a, to the converter 16a so that the condition of the individual sensors 14a, 14b, or 14c at any particular time may be transferred to the collector 16a.

Turning to the sensor 14c, it will be seen that this sensor is formed by an excitation coil 110, pick-up coils 112 and 114, and a core 115. The excitation coil 110 is a simple electrical coil that is connected to the carrier frequency bus 108 and is constantly in electrical communication with the carrier frequency supply 106. In close proximity to the excitation coil 110 are the pick-up coils 112 and 114. Pick-up coil 112 and pick-up coil 114 are identical to each other except that the windings of pick-up coil 114 are in a reverse direction as compared with pick-up coil 112. Under these circumstances, when there is no core 115 present, the two coils 112 and 114 produce a null pick-up reading since the flux transferred from excitation coil 110 to the pick-up coils 112 and 114 will cancel itself in the pick-up coils 112 and 114 and associated circuitry.

The core 115 is a simple metallic element which disturbs the flux path between excitation coil 110 and pick-up coils 112 and 114. When the flux path is so disturbed, a reading is produced by pick-up coils 112 and 114 and this reading is transmitted through contact points 90c and 92c of collector 12a through wipers 90 and 92 of collector 12a through the converter 16a.

The core 115 is always located in the same position relative to the coils 110, 112, and 114. Accordingly, the particular size or variation in other physical properties of the core 115 will give a different reading for each different core. Thus, the properties of the core 115 can be utilized as a means of identification of the individual item which is sensed by sensor 14c. Since a group of excitation and pick-up coils will be substantially identical to each other, a particular core can be located throughout the system because of its unique physical properties; thus, a core may appear in an unexpected location and its article, which may have been considered to be lost or removed, will be located.

In the illustration of sensor 14c, the core 115 is shown attached to a garment hanger 116. The garment hanger 116 would be utilized to support one particular size of garment. The core 115 would be of such dimensions that it represented the particular garment size. The excitation coil 110 and the pick-up coils 112 and 114 would be permanently mounted on the clothing rack (not shown). When no hanger was in that particular position on the clothing rack, the null signal would indicate the absence of any garment in that position. When a particular hanger was positioned so that the core 115 would be between the coils 110 and 112 and 114, a signal of the particular size of garment associated with the particular core 115 would be relayed to converter 16a each time the sensor 14c was interrogated. One garment rack would have many garment positions, each equipped with an excitation coil and pick-up coils as shown in the illustrated sensor 14c.

The sensor 14b is also an analogue sensor which has an excitation coil 120, pick-up coils 122 and 124, a core 126, as shown in FIGURE 2. The excitation coil 120 is connected to the carrier frequency supply 106 through carrier frequency bus 108. The pick-up coils 122 and 124 are reverse wound so that they produce a null when core 126 is centered. The pick-up coils 122 and 124 are in series and are electrically connected to contact points 90b and 92b on sensor 12a. Thus, when the wipers 90 and 92 are in the appropriate position, the pick-up coils 122 and 124 are electrically connected to the converter 16a.

The core 126 of sensor 14b is connected to a load platform 128 which supports boxes 130. The sensor 14b is, essentially, a weight discriminating sensor which provides a different reading for each different weight positioned on the platform 128. The size of core 126 remains constant in sensor 14b, but the core takes various vertical positions relative to coils 120, 122, and 124, depending upon the weight of the boxes 130 on loading platform 128 and the restraint of the flexure members 129. Thus, the greater the weight of the boxes 130, the further down between coils 120, 122, and 124 the core 126 is moved. When boxes of a known weight, such as canned goods, are positioned on platform 128, the number of boxes appearing thereon is a function of the weight and so the number of boxes is known when the total weight of the boxes is recorded.

Analogue sensor 14a also consists of an excitation coil 134 and pick-up coils 134 and 136 wound on a core 138. Coils 134 and 136 are identical except that they are wound in a reverse direction to produce a null reading when no metal container 140 is present over them. The excitation coil 132 is electrically connected through carrier frequency bus 108 to the carrier frequency supply 106. The sensor 14a indicates the presence or absence of a metal container 140 in the particular position. If there is a metal container 140 in position, a flux reading is produced in pick-up coils 134 and 136, which is different than the null reading produced when no container is present. The core 138 directs the flux through the metal container 140 in a manner that permits the sensor 14a to be mounted flush with the non-magnetic supporting surface if desired. Accordingly, when the wipers 90 and 92 are on contacts 90a and 92a respectively of collector 12a, the pick-up coils 134 and 136 are electrically connected to converter 16a.

In FIGURE 2, the analogue sensors 14a, 14b, and 14c, are connected in one branch through collector 12a and report into converter 16a. The operation of this branch in the overall sequence will be more fully described hereinafter.

A digital collector 12b is provided to connect digital sensors 14d and 14e to converter 16b upon appropriate signal from the command unit 10.

The collector 12b is formed essentially of a conventional step switch having a selection wiper 150 and an address wiper 152. A stepping coil 154 causes the wipers 150 and 152 to move through linkage 159. A digital collector power source 158 is provided to close the contacts of each of the digital sensors 14d and 14e at appropriate times. This power source also provides a data address to the address bus 104 through wiper 152 when a particular sensor 14d or 14e is interrogated.

Referring to the digital sensor 14d, the sensor has identification switches 160a, 160b, 160c, and 160d, which are the contacts of a special relay actuated by coil 162. When the coil 162 is actuated and switches 160 are closed, the sensor power source 164 is connected to a data bus 166 that transmits the electrical signal from source 164 to the converter 16b.

The digital sensor 14d is essentially an article identification sensor. An article identification tab 168 is attached to each article to be sensed by sensor 14d. When the article is placed in position, the article identification tab 168 interferes with the closing of certain of the switches 160. Accordingly, those switches which are held open by identification tab 168 transmit a null on the data bus 166 to the converter 16b. As shown on sensor 14d, the article identification tab 168 would hold open switches 160b and 160d. Accordingly, when sensor 14d was interrogated, there would be a reading onto the data bus 166 through switches 160a and 160c and the particular article having the tab 168 would be identified to converter 16b. Likewise, if an article is misplaced, its identification tab would enable it to be located because of the unique identification signal that it produces on the data bus 166.

The digital sensor 14e is generally similar to that of 14d and shows an alternate construction. The digital sensor 14e is also an identification type sensor. The sensor 14e has a tie in relay 170 which connects the sensor itself to the data bus 166 when the tie in relay is actuated by collector 12d. Reed switches 172a, 172b, 172c, and 172d, connect the sensor power source 174 to the data bus 166. The reed switches 172 are conventional glass enclosed magnetic switches. The article 178 has an identification plate 176 attached thereto. Identification plate 176 is magnetic and closes the reed switches 172 in appropriate patterns. In the illustrated sensor 14e, the identification plate 176 sets up a flux path 180 which closes reed switches 172b and 172d, thereby transmitting a signal through those switches to the data bus 166 and identifying the article in that particular location.

When the final position of step switch 62 is reached, illustrated by 68d, a signal is transmitted back from the last collector (not shown) on line 71. This causes the step switch to move to position 68e and simultaneously causes the drive control relay to be deactuated by equalizing the voltage impressed across the coil.

OPERATION OF THE EMBODIMENT OF FIGURE 2

Having considered the relationship of all the elements in the system of FIGURE 2, the sequence of operation of the particular inventory data acquisition apparatus there shown can be considered. The operation will be considered from the standpoint of printing an inventory condition at a particular time.

When the first interrogation of the system has been completed, the command unit 10 will have the master step switch 62 with its wipers 64, 66, and 68, on contact points 64e, 66e, and 68e, respectively. Either the cam 53, the manual start 54, or the auto start connected at 55, will cause power from source 56 to initiate the first movement of the new interrogation sequence to be here described.

When power source 56 is connected either through contact 52, contact 54, or the auto start connected at 55, to the stepping relay coil 60, the wipers 64, 66, and 68 will be advanced to contact points 64a, 66a, and 68a, respectively. When this occurs, further advancement of the step switches will be prevented since the power connection from power source 56 to coil 60 will be broken by the opening of the connection of wiper 68 to contact 68e. At the same time that the master step switch 62 is advanced to contact points 64a, 66a, and 68a, power will be conducted from power source 56 to the tape drive control relay 80 to initiate movement of the tape drive control unit 50.

With the wipers 64, 66, and 68 of the master step switch 62 on contact points 64a, 66a, and 68a, the converter coil power source 70 will be connected through wiper 64 to converter relay 17a so that converter 16a will be actuated and connected to comparator 18 and tape perforator 24.

The sensor advance wiper 66 of master step switch 62 and command unit 10 will transmit pulses from power source 72 and pulse generator contact 74 to the stepping coil 96 of collector 12a at appropriate intervals. The collector advance wiper 68 of master step switch 62 will be positioned on contact point 68a and will be prepared to receive a signal from collector 12a to advance the master step switch 62 when the full sequence of collector 12a has been completed.

At collector 12a, when the first pulse from pulse generator 74 is received through sensor advance wiper 66 of master step switch 62, the wipers 90, 92 and 94 of collector 12a will advance to points 90a, 92a, and 94a, respectively. With wipers 90 and 92 at points 90a and 92a respectively, the pick-up coils 112 and 114 of sensor 14c will be connected to the converter 16a to receive the signal from sensor 14c. At the same time, the address wiper 94 will be on contact point 94a so that an address for the information coming from sensor 14c will pass from address register 102 to the tape drive control unit 50 and to the tape perforator 24 and thence to drive unit 28. Thus, the information, that is, the identification of the particular garment on hanger 116 as previously described, will be transmitted into converter 16a and thence into perforator 24 and comparator 18 which may pass it to the decoder 20 and printer 22 to print the particular item of inventory. At the same time, the address which locates this particular sensor passes from address register 102 to perforator 24 and to the printer 22.

This interrogation step of sensor 14c takes approximately one second or the time interval of the pulse from pulse generator 74 which passed to the collector 12a. When the second pulse passes from pulse generator 74 through wiper 66 to the collector 12a, the stepping coil 96 of collector 12a causes the wipers 90, 92, and 94 to be advanced from contactor points 90a, 92a, and 94a respectively, to contact points 90b, 92b, and 94b respectively. At that time, the information from sensor 14b passes through collector 12a to converter 16a and an address, because of the power signal from source 100 through wiper 94 to the address register 102, is sent to the perforator 24 to accompany the information from sensor 14b.

On the next pulse from pulse generator 74, the step switch of collector 12a advances to the next contact point thereby providing information from sensor 14c to converter 16a. In the drawing, only three sensors are shown for collector 12a, although more sensors for the collector could be positioned, provided the appropriate number of points on the step switch were provided. Accordingly, at each pulse, the step switch 12a would move to the next contact point. When the wipers 90, 92 and 94 are advanced, pulse by pulse, until the wiper 94 reaches point 94e, the individual pulses will cause stepping of the collector 12a. When point 94e is reached, the power source 100 which had been providing a signal for the address register 102 will cause a signal to be transmitted through wiper 94 to point 94e thence to point 68a on master step switch 62 of command unit 10. From point 68a, the signal will pass into wiper 68 and thence through relay 59 to stepping relay coil 60. When the signal is sent to coil 60, the master step switch 62 will advance so that wiper 64 progresses from point 64a to 64b, wiper 66 progresses from point 66a to 66b, and wiper 68 progresses from 68a to 68b. With the wiper 64 at point 64b, the converter coil power source 70 will be connected to converter relay 17b so that converter 16b will then be electrically connected to comparator 18 and tape perforator 24. At the same time, the pulse generator power source 72 will be connected through the pulse generator contact 74 to wiper 66 which connects it to the stepping coil 154 of collector 12b. The wiper 68 of master step switch 62 will be positioned to receive the signal at the end of the complete sequence of collector 12b to further advance the master step switch.

At the first pulse passing through wiper 66 to stepping coil 154, the wipers 150 and 152 will be advanced to points 150d and 152d, respectively. At that point, the power source 158 will simultaneously close the relay 162 for sensor 14d and also transmit a signal to data address register 102 to provide the data from sensor 14d with an address. When the relay 162 closes, the pattern impressed by article identification tab 168 on sensor 14d will be transmitted through the data bus 168 to the converter 16b. The converted signal from converter 16b will be fed to the perforator 24, comparator 18 and thence to the decoder 20 and printer 22. At the same time, the address for this data will pass from the address register 102 into the perforator 24 and thence to the decoder 20 and printer 22. When the next succeeding pulse from pulse generator 74 reaches the step switch coil 154 of collector 12b, the wipers 150 and 152 will move to positions 150e and 152e respectively. Again, the signal from sensor 14e will be transmitted to converter 16b and the data address register 102 will receive a signal to provide an address for the information.

On the next pulse, the step switch of collector 12b will again advance. No additional sensors are shown on the drawing, however, it will be appreciated that several sensors can be associated with the collector 12b. After the last point, 152f, has been reached by wiper 152 of collector 12b, the power source 158 provides a signal back through the wiper 68 of master step switch 62 to cause the next advance of the master step switch 62. Thus, additional collectors (not shown) can be provided for the master step switch 62 and further interrogation of sensors can be provided.

Interrogation of sensors is terminated when a signal from the last collector (not shown) causes the drive control relay coil 60 to be deactuated.

The data from each of the sensors passes through the computer components to provide printing of the particular inventory data, or comparison of the inventory data as has previously been explained in connection with FIGURE 1.

EMBODIMENT OF FIGURE 3

In FIGURE 3 is shown another embodiment of the present invention which differs from that of FIGURE 2 essentially in the type of sensors that are utilized to provide the initial inventory data. The sensors of FIGURE 3 can be hydraulic, pneumatic and electrical. The basic arrangement is similar to that shown in FIGURE 2. Where the elements of FIGURE 3 are identical to those of FIGURE 2, the same numerals have been utilized for reference. Where the elements of FIGURE 3 are similar to those of FIGURE 2, prime suffixes have been added to the numerals. The computer elements of FIGURE 3 are identical to those shown in FIGURE 2 except that the converters 16g, 16h, 16j, and 16k of FIGURE 3 are particularly adapted for the inventory sensors utilized in the elements.

This description will move to explaining the relation of the collectors and individual sensors of FIGURE 3 and then the overall operation of the FIGURE 3 embodiment will be described.

The collector 12g of FIGURE 3 consists of a collector valve 184 and an electrical step switch having wiper 208 which are connected together by mechanical linkage 192 and 206 to a stepping coil 194. Accordingly, when stepping coil 194 moves, the valve core 186 and the step switch wiper 208 each move. The core 186 of collector valve 184 has a passage 188 formed therein. Passage 188 connects the surface of the core to the converter 16g through a conduit 190. As the valve core 186 moves linearly, passage 188 successively connects to passages 198, 200, 202, and 204 that are formed in the valve body 196.

The wiper 208 of the electrical step switch in collector 12g is an address wiper which, as it steps, provides a signal to the address register 102 through the address bus 104 to provide an address for each of the items of information received from the particular individual sensors. The address power source 210 provides the excitation for the address wiper 208.

Each of the sensors associated with collector 12g is actuated by a common gas pressure supply 212a. Sensors 14g, 14h, 14j, and 14k are each actuated by that supply and report to the collector 12g.

The sensor 14g is a simple ball valve 214 connected to a support platform 216. The gas pressure 212a is ported to atmosphere past ball valve 216. When the valve core 186 is in a position that the passage 188 registers with passage 198 in the valve body, a signal is received from sensor 14g. If there is an item on the platform 216, the ball valve 214 prevents escape of pressure and a high pressure is indicated to the converter 16g, thereby indicating presence of an article on the platform 216. If, on the other hand, no article is present, no pressure is indicated to the converter 16g.

The sensor 14h is generally similar to that of 14g except that the article itself provides the blockage of the flow. In sensor 14h, an orifice 220 is exposed to the atmosphere. When an article 218 is placed over orifice 220, high pressure registers back to the converter 16g.

The sensor 14j is essentially a weight sensitive sensor in that the load platform 222 has a portion 222a which blocks orifice 224 at varying distances and a flexure support 223 which restrains motion of the load platform 222. Accordingly, the pressure registered at valve 184 will be a function of the distance and therefore a function of the weight of the articles 226 on the platform.

The sensor 14k indicates the height of a stack of articles. There is a vertical passage with a series of orifices 228a, 228b, 228c, and 228d. The articles 230, 232, and 234 are stacked next to the orifices so that if an article is present it blocks the orifice. The number of orifices in the passage will control the rate of escape of the gas from source 212a. If all of the orifices are opened, thereby indicating the absence of articles 230, 232, and 234, there will be a high rate of escape and a low pressure indicated back at valve 184. On the other hand, if all of the orifices are blocked, there will be high pressure at valve 184. This sensor, then, will indicate the stack of articles as a function of pressure at valve 184.

As previously described in connection with FIGURE 2, the collector 12g will be caused to step at each pulse from pulse generator 74 when the master control stepper 62 is connected to collector 12g. Accordingly, a reading from each of the sensors 14g, 14h, 14j, and 14k will be received and indicated to converter 16g in order. At the same time, the data address will be provided through the wiper 208. When the wiper 208 reaches its last position, a signal will be sent to the wiper 68 of master stepper 62 to cause stepping of the master step switch.

When the master step switch 62 causes the wipers 64, 66, and 68 to reach contact points 64h, 66h, and 68h respectively, the converter 16h is directly connected to comparator 18 and the tape perforator 24. Converter 16h is a serial digital converter which requires no collector to sequence it. When the wiper 64 causes actuation of the converter relay 17h, it simultaneously causes actuation of a valve actuator 336 which opens valve 338 from the gas pressure supply 212b. The opening of valve 338 causes gas pressure to flow from 212b through the pneumatic line 340. The passage through this line progresses through a series of indicators. The indicators are provided by a support platform 334 that, when empty, permits free flow through the pneumatic line 340 but, when having an article 346 positioned thereon, locally blocks free flow through line 340 and causes flow through by-pass valves 342a, 342b, or 243c. When the flow begins at the pressure source 212b, it passes freely through the line at the position of valve 342a since there is no article thereon. At valve 342b, the flow is impeded by article 346 and must by-pass through the flapper of valve 342b. When it must so detour, a pressure pulsation is caused in line 340. These pressure pulsations are counted at the converter 16h. Each time that the flow is forced to by-pass, the pulsation is caused. When the flow from source 212b finally reaches the bellows 343, it actuates a switch 345 which connects the power source 347 back through point 68h of the master step switch 62 thereby causing the master step switch to step to the next position. It also connects the power source 347 to the tape drive control relay coil 80 so that the voltage across it will be equalized and it will deactuate. When wiper 64 leaves position 64h, the valve actuator 336 is deactuated and valve 338 closes. The pneumatic line 340 is provided with a bleed orifice 341 so that after the series of items has been interrogated, the pressure may bleed out of line 340 to permit it to be ready for a second interrogation at a later time.

When the wipers of master stepper 62 reach points 64j and 68j respectively, the converter 16j is actuated and placed into communication with comparator 18 and tape perforator 24. The converter 16j receives a signal from an electrical circuit having therein a power source 348, electrical heaters 350, bimetallic switches 352a and 352b, relays 354a and 354b, and by-pass switches 356. The bimetallic switches 352a and 352b and the by-pass switches 356 are closed when there is an article 360 in position over the switch. When the respective bimetallic switches are closed, there is a continuous current through the entire circuit of converter 16j. When any of the switches are opened, some unusual action is required to close the switch. If a bimetallic switch 352 is open, its heating element 350 is actuated by the preceding circuit, causing the switch to close after a short interval of time, and putting the next unit on the line. During the time that the switch is open and until it closes, there is an established current level in the circuit through resistor 362. This current level is sensed by converter 16j. When the switch closes, this current level instantaneously steps to a higher level. Likewise, if a switch 356 is open, due to the absence of an article, then the relay 354a or 354b is closed a short length of time after the completion of the circuit through its coils. The level of current then instantaneously rises and these steps are sensed in converter 16j. When the current passes entirely through the circuit, it energizes the contact point 68j on master control step switch 62 causing the step switch to step to the next position through wiper 68 and relay 58. The number of steps are counted and this number indicates the number of missing articles to converter 16j which causes the information to be registered in the computer elements.

When the wipers of the master switch 62 reach points 64k and 68k, the converter 16k is actuated. At the same time, the time delay relay 182 is actuated to open the contact after a specified period of time. When converter 16k is actuated, the pressure in line 366 which is static hydraulic pressure, indicates or is a function of the amount of pressure applied to the elastic pads 368 by the objects resting thereon. If the objects are of uniform size and weight, the number of objects on the pads will be reflected by the total pressure in the static hydraulic line 366. This static pressure causes the bellows 370 to assume a position that is a function of the pressure. This bellows position 370 is transmitted through wiper arm lever 372 to the wiper 374. Wiper 374, by its position, produces an electrical signal for converter 16k which signal is transmitted into the comparator 18 and the tape perforator 24. The time delay relay 182 is set so that there is sufficient time for the signal to reach an equilibrium and then the reading is terminated by time delay relay 182 which produces a pulse on point 68k of the master stepper.

OPERATION OF EMBODIMENT OF FIGURE 3

The embodiment of FIGURE 3 has the master stepper 62 similar to that of FIGURE 2. Master stepper action is initiated by the start relays 52 or 54 and moves to the first position. After moving from the first position, the wipers 64, 66, and 68 would move to position 64k, and 68k. In that position, the converter 16k would provide its reading to the computer components. After the reading was provided, the timed delay relay 182 would cause a pulse from wiper 64 to reach the point 68k at which time the master step switch would be stepped through its coil 60. The wipers would then move so that points 64j and 68j were activated. At that time, the converter 16j would provide its reading to the computer elements until the signal was received at point 68j to step the master stepper to cause points 64g, 66g, and 68g to be actuated.

When points 64g, 66g, and 68g are actuated, the signal would be provided to collector 12g to cause it to run through its sequence by pulsation from pulse generator 74 as has previously been described. When the last position was reached by wiper 204 of collector 12g, a signal would be transmitted to point 68g of master stepper to cause stepping of the master step switch.

At that time, points 64h and 68h would be reached by wipers 64 and 68 respectively. This connection would cause the converter 16h to be actuated and to report its sensor conditions to the computer components. Also, a signal is provided to the drive control relay 80 causing it to deactuate and thus stop the tape drive 28.

It will be appreciated that various combinations of FIGURES 2 and 3 can be utilized and that many more components can be provided for each circuit. The description herein contained is designed to be illustrative of the present invention and is not a complete circuit diagram. It is a schematic diagram to illustrate all components and their relations to each other.

According to the provisions of the patent statutes, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:
1. An automatic data acquisition and comparison apparatus comprising:
   (a) a plurality of different types of sensing elements positioned among an inventory of stock to signal upon interrogation the presence and identity of items of inventory located at a plurality of locations by generating either analogue or digital signals which characterize the items of inventory,
   (b) circuit means including a command unit and collector means associated with said sensing elements for periodically and selectively interrogating each of said sensing means,
   (c) converter means coupled to said collector means for converting said analogue and digital signals to digital signals,
   (d) addressing means in circuit with said command unit and said converter means,
   (e) recording means associated with said circuit means, said converter means and said addressing means to record the response and address of each of said sensing elements for each interrogation,
   (f) storage means connected to said recording means,
   (g) comparator means coupled to said storage means for comparing current and previously recorded responses.

2. The apparatus of claim 1 wherein said sensing elements include a sensing element comprising an excitation coil continuously excited by a carrier frequency, a pick-up coil in proximity to said excitation coil to have a current induced thereon by said excitation coil, a movable metal core positionable between said excitation coil and said pick-up coil whereby the induced current in said pick-up coil varies with the position of said core, said pick-up coil being connected to said converter to provide a signal to said converter to thereby relate the core position of said sensing element to said converter.

3. The apparatus of claim 1 wherein said sensing elements include a sensing element comprising an excitation coil continuously excited by a carrier frequency, a pick-up coil in proximity to said excitation coil to have a current induced thereon by said excitation coil, a movable metal core positionable between said excitation coil and said pick-up coil whereby the induced current in said pick-up coil varies with the physical properties of said core, said pick-up coil being connected to said converter to provide a signal to said converter to thereby relate the physical properties of said core to said converter.

4. The apparatus of claim 1 wherein said sensing elements include a sensing element designed to record the presence of a metal container thereon comprising an excitation coil continuously excited by a carrier frequency, a pick-up coil in proximity to said excitation coil to have a current induced thereon by said excitation coil, said current induced on said pick-up coil being of a first value when said container is not in position on said sensing element, said current induced on said pick-up coil being of a second value when said container is in position and said sensing element, said pick-up coil being connected to said converter to provide a signal to said converter to thereby relate the presence or absence of said container to said converter.

5. The apparatus of claim 1 wherein said sensing elements include a sensing element adapted to transmit a coded signal to said converter, said sensing element comprising a plurality of electrical switches that are closed when said sensing element is actuated, a power source to transmit signals through said electrical switches to said converter, and an indicating tab associated with an inventory article to open certain of said electrical switches when said article is in position to thereby identify said article.

6. The apparatus of claim 1 wherein said sensing elements include a sensing element adapted to transmit a coded signal to said converter, said sensing element comprising a plurality of electrical switches that are open when not influenced by a magnetic attraction, a power source to transmit signals through said electrical switches to said converter, and a magnetic indicating plate associated with an inventory article to close certain of said electrical switches by magnetic attraction when said article is in position to thereby identify said article.

7. The apparatus of claim 1 wherein said sensing elements include a sensing element comprising a source of gas pressure, a pressure conduit from said source to said converter, a relief conduit extending from said pressure conduit to an orifice, said orifice permitting escape of gas pressure when no inventory article is in position, and inhibiting escape of gas pressure when an inventory article is in position, the pressure in said pressure conduit thereby signaling to said converter the condition of said location relative to whether an inventory article is in position.

8. The apparatus of claim 1 wherein said sensing elements include a source of gas pressure, a bus conduit connecting said source of gas pressure to a series of by-pass valves, restrictor valves in said conduit that close when an inventory article is placed in position over each of said restrictor valves, said restrictor valves being so located relative to said by-pass valves that when a restrictor valve is closed, the flow in said conduit is forced through a by-pass valve thereby causing a pressure pulse, said bus conduit being connected to said converter so that when flow takes place from said source of gas pressure through said bus conduit, the number of pulses created by said restrictor valves indicate to said converter the number of inventory articles in position.

References Cited

UNITED STATES PATENTS

| | | | |
|---|---|---|---|
| 3,340,509 | 9/1967 | Krause | 340—149 |
| 2,877,444 | 3/1959 | Hawley | 340—183 |
| 2,937,369 | 5/1960 | Newbold et al. | 340—183 |
| 2,946,044 | 7/1960 | Bolgiano et al. | 340—147 |
| 3,045,210 | 7/1962 | Langley | 340—150 |
| 3,069,656 | 12/1962 | Wright | 340—151 |
| 3,103,001 | 9/1963 | Hage | 340—183 |
| 3,145,374 | 8/1964 | Benner et al. | 340—183 |
| 3,164,771 | 1/1965 | Milford | 340—151 |

FOREIGN PATENTS 1,000,850  8/1965  Great Britain.

OTHER REFERENCES

Article: "Automation Via Digital Conversion," Instruments and Automation, vol. 27, p. 926, June 1954 (copy in 340—183).

DONALD J. YUSKO, *Primary Examiner.*

U.S. Cl. X.R.

340—147